United States Patent
Brink

[11] Patent Number: 6,095,318
[45] Date of Patent: Aug. 1, 2000

[54] CONVEYOR SCRAPER AND MOUNTING OF SCRAPER BLADE

[75] Inventor: Arend J Brink, Witbank, South Africa

[73] Assignee: Scorpio Conveyor Products (Proprietary) Limited, South Africa

[21] Appl. No.: 09/111,585

[22] Filed: Jul. 6, 1998

[30] Foreign Application Priority Data

Jul. 25, 1997 [ZA] South Africa ............................ 97/6633

[51] Int. Cl.⁷ .................................................. B65G 45/00
[52] U.S. Cl. ............................................................ 198/499
[58] Field of Search .............................................. 198/499

[56] References Cited

U.S. PATENT DOCUMENTS

| | | |
|---|---|---|
| D. 356,026 | 3/1995 | Iaia et al. . |
| 1,933,485 | 11/1933 | Rund et al. ............................. 198/203 |
| 2,646,063 | 7/1953 | Hayes . |
| 3,104,813 | 9/1963 | Baatrup . |
| 3,104,825 | 9/1963 | Hayes . |
| 3,106,347 | 10/1963 | Hayes . |
| 3,181,797 | 5/1965 | Hayes . |
| 3,201,049 | 8/1965 | Hayes . |
| 3,381,899 | 5/1968 | Forsman . |
| 3,865,232 | 2/1975 | Koenig et al. ........................... 198/230 |
| 4,036,351 | 7/1977 | Reiter ....................................... 198/499 |
| 4,057,505 | 11/1977 | Nakagawa et al. . |
| 4,071,463 | 1/1978 | Steinhauer . |
| 4,105,109 | 8/1978 | Schultz .................................... 198/499 |
| 4,113,645 | 9/1978 | DeSimone . |
| 4,116,851 | 9/1978 | Rupe et al. . |
| 4,290,520 | 9/1981 | Rhodes .................................... 198/499 |
| 4,355,739 | 10/1982 | Vierkotter . |
| 4,489,890 | 12/1984 | Martin . |
| 4,527,741 | 7/1985 | Garneau . |
| 4,570,856 | 2/1986 | Groth et al. . |
| 4,618,077 | 10/1986 | Corsette . |
| 4,633,999 | 1/1987 | Perneczky ............................... 198/499 |
| 4,747,523 | 5/1988 | Dobbs . |
| 4,768,644 | 9/1988 | Cromm .................................... 198/499 |
| 4,789,495 | 12/1988 | Cahall et al. . |
| 4,801,046 | 1/1989 | Miczka . |
| 4,806,263 | 2/1989 | Leathers et al. . |
| 4,811,833 | 3/1989 | Slikker ..................................... 198/499 |
| 4,944,386 | 7/1990 | Swinderman ........................... 198/499 |
| 4,964,539 | 10/1990 | Mueller . |
| 5,009,342 | 4/1991 | Lawrence et al. . |
| 5,011,002 | 4/1991 | Gibbs ....................................... 198/497 |
| 5,039,016 | 8/1991 | Gunzel, Jr. et al. . |

(List continued on next page.)

FOREIGN PATENT DOCUMENTS

| | | |
|---|---|---|
| 0 574 600 A1 | 12/1993 | European Pat. Off. . |
| 3742583 | 5/1989 | France ................................. 198/499 |
| 2683804 | 5/1993 | France ................................. 198/499 |
| 44 20 511 A1 | 6/1991 | Germany . |
| 94 05 735 | 4/1994 | Germany . |
| 94 06 111 | 6/1994 | Germany . |
| 69-31926 | 2/1988 | Japan . |
| 0218420 | 9/1988 | Japan .................................... 198/499 |
| 0282017 | 11/1988 | Japan .................................... 198/499 |
| 2002691 | 11/1993 | Russian Federation .............. 198/499 |
| 740637 | 6/1980 | U.S.S.R. . |
| 2040249 | 8/1980 | United Kingdom ................... 198/499 |
| 2042454 | 9/1980 | United Kingdom ................... 198/499 |
| 2143792 | 2/1985 | United Kingdom ................... 198/499 |
| 2 315 724 | 7/1997 | United Kingdom . |
| 2 290 276 | 3/1998 | United Kingdom . |

*Primary Examiner*—Christopher P. Ellis
*Assistant Examiner*—Khoi H. Tran
*Attorney, Agent, or Firm*—Locke Reynolds LLP

[57] ABSTRACT

A conveyor scraper includes a support structure and a scraper blade which is mounted to the support structure by a mounting element so that it is movable to a limited extent relative to the support structure. A biasing element acts between the support structure and the scraper blade to ensure contact with an adjacent conveyor. A mounting element that mounts the scraper blade to the support structure includes a zone of weakness that permits the scraper blade to deflect laterally in the event of impact by an irregularity on the passing conveyor belt surface.

16 Claims, 4 Drawing Sheets

U.S. PATENT DOCUMENTS

| | | |
|---|---|---|
| 5,052,590 | 10/1991 | Ratcliff . |
| 5,088,965 | 2/1992 | Swinderman et al. ................... 474/101 |
| 5,100,059 | 3/1992 | Englhard et al. . |
| 5,143,261 | 9/1992 | Drobish . |
| 5,152,461 | 10/1992 | Proctor . |
| 5,201,402 | 4/1993 | Mott ........................................ 198/499 |
| 5,213,197 | 5/1993 | Mohri ....................................... 198/499 |
| 5,213,265 | 5/1993 | Englhard et al. . |
| 5,223,168 | 6/1993 | Holt . |
| 5,290,470 | 3/1994 | Dutcher . |
| 5,298,142 | 3/1994 | Gassner ................................... 204/300 |
| 5,310,042 | 5/1994 | Veenhof .................................. 198/497 |
| 5,320,288 | 6/1994 | Ketcham, Jr. . |
| 5,332,157 | 7/1994 | Proctor . |
| 5,339,947 | 8/1994 | Campanile .............................. 198/499 |
| 5,370,275 | 12/1994 | Mills et al. . |
| 5,376,296 | 12/1994 | Dutcher . |
| 5,383,603 | 1/1995 | Englhard et al. . |
| 5,385,270 | 1/1995 | Cataneo et al. . |
| 5,398,846 | 3/1995 | Corba et al. . |
| 5,402,916 | 4/1995 | Nottingham et al. . |
| 5,412,461 | 5/1995 | Thayer .................................... 355/299 |
| 5,433,350 | 7/1995 | Graubart . |
| 5,439,141 | 8/1995 | Clark et al. . |
| 5,467,900 | 11/1995 | Maas et al. . |
| 5,472,119 | 12/1995 | Park et al. . |
| 5,518,107 | 5/1996 | Schwarze ................................ 198/499 |
| 5,535,950 | 7/1996 | Barriac et al. . |
| 5,560,545 | 10/1996 | Grogan et al. . |
| 5,562,250 | 10/1996 | O'Neill . |
| 5,564,600 | 10/1996 | Renault . |
| 5,566,860 | 10/1996 | Schiltz et al. . |
| 5,567,247 | 10/1996 | Hawes et al. . |
| 5,586,695 | 12/1996 | Labus et al. . |
| 5,595,345 | 1/1997 | Chura et al. . |
| 5,605,578 | 2/1997 | Hawes et al. . |
| 5,626,259 | 5/1997 | Maas et al. . |
| 5,676,280 | 10/1997 | Robinson . |
| 5,676,282 | 10/1997 | Satterfield . |
| 5,692,595 | 12/1997 | Gilbert .................................... 198/499 |
| 5,713,519 | 2/1998 | Sandison et al. . |
| 5,735,385 | 4/1998 | Bowler et al. ........................... 198/499 |
| 5,735,422 | 4/1998 | Binter . |
| 5,797,477 | 8/1998 | Veenhof .................................. 198/499 |
| 5,799,776 | 9/1998 | Dolan ...................................... 198/499 |
| 5,875,881 | 3/1999 | Brink ....................................... 198/499 |
| 5,944,167 | 8/1999 | Brink ....................................... 198/499 |

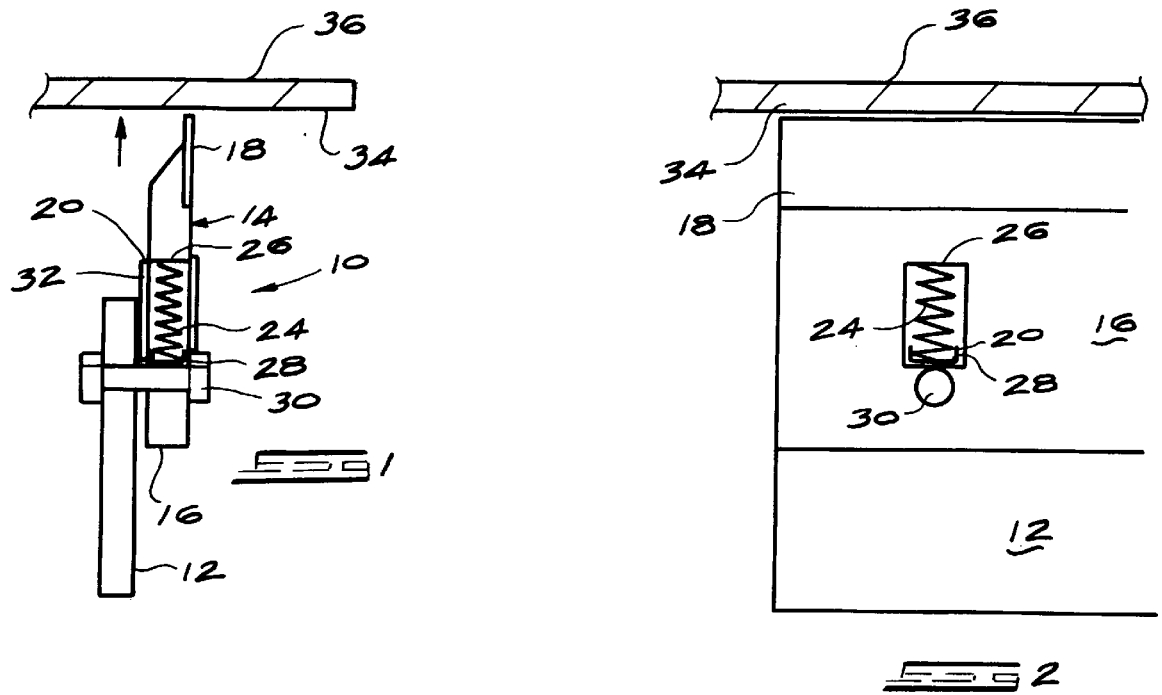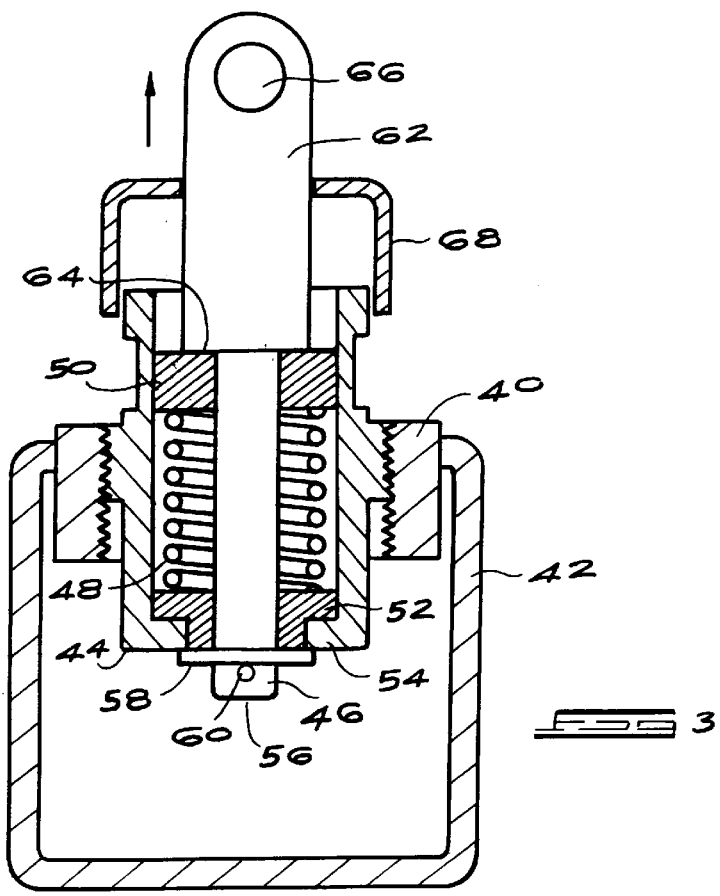

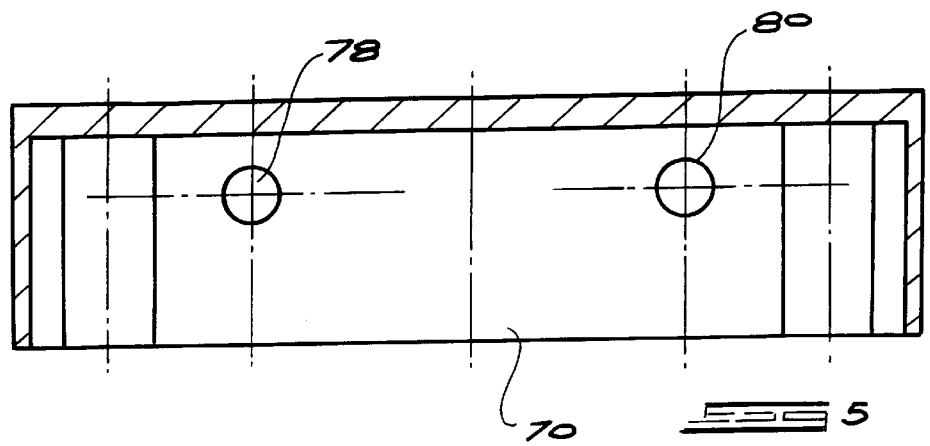
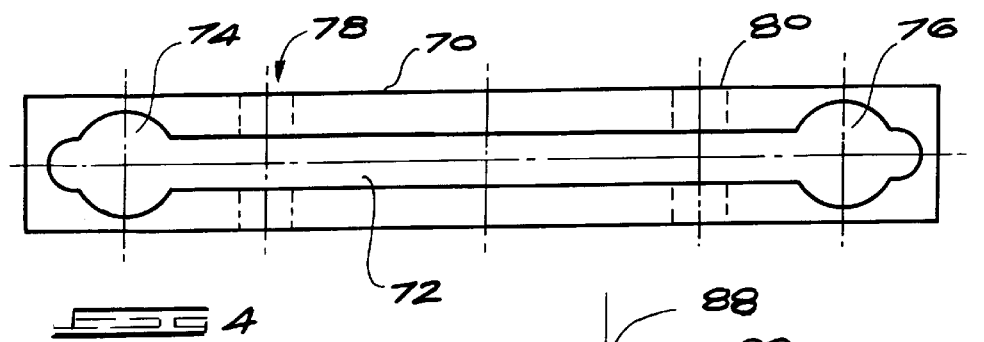
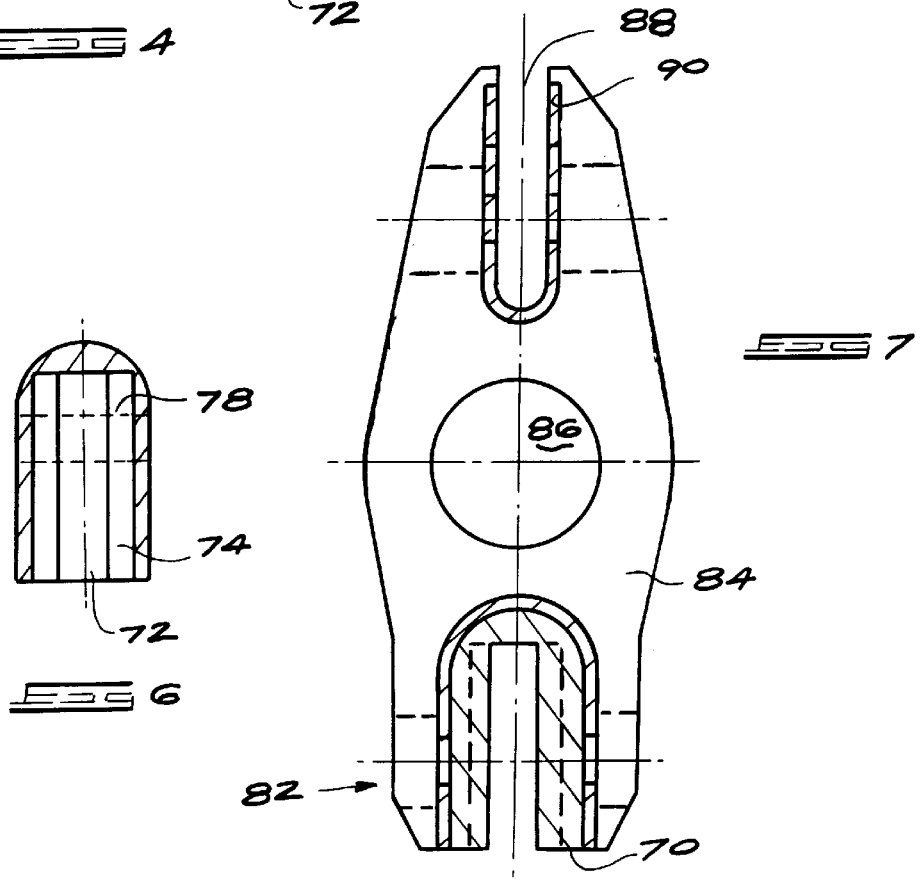

CONVEYOR SCRAPER AND MOUNTING OF SCRAPER BLADE

BACKGROUND OF THE INVENTION

This invention is concerned generally with the mounting of a conveyor scraper relatively to a conveyor belt.

A conveyor scraper, during use, should be able to move in a vertical sense relatively to the direction of movement of a conveyor belt with which the scraper is engaged in order to allow for movement of the belt and ensure that the scraper is retained in scraping engagement with the belt surface. This type of vertical movement is also necessary to compensate for wear of the scraper blade which arises due to the abrading action of the conveyor belt surface on the scraper.

It is possible to adjust a scraper blade, at periodic intervals, using manual techniques, to compensate for scraper blade wear. On the other hand it is preferable to have an automatic means of compensating for such wear.

SUMMARY OF THE INVENTION

The invention provides a conveyor scraper which includes support structure, scraper blade means which is mounted to the support structure and which is movable to a limited extent relatively to the support structure, and biasing means which acts directly or indirectly between the support structure and the scraper blade means.

The biasing means may take on any suitable form and may for example comprise at least one spring, torsion member, or any equivalent device.

The biasing means may be engaged with a formation on the scraper blade means. The formation may be of any appropriate kind and for example may comprise a slot or similar formation which at least partially accommodates the biasing means.

In a different form of the invention the biasing means may act in a piston and cylinder assembly. For example the biasing means may act on a piston and cylinder assembly wherein the piston is engaged with the cylinder and is movable relatively thereto with at least one attachment formation being provided to enable the scraper blade means to be attached directly or indirectly to the piston or the cylinder.

In a preferred form of the invention the scraper blade means is fixed to an extension of the piston.

The biasing means may for example comprise a spring which extends circumferentially around the piston and which acts between the cylinder and a formation on the piston.

The cylinder may be mounted for movement relatively to support structure so that the position of the cylinder may be adjusted towards or away from a conveyor belt.

For example the support structure may include a threaded socket and the cylinder may be threadedly engaged with the socket.

A protective shroud may be provided to prevent the ingress of dirt or foreign material between opposing relatively slidable surfaces of the cylinder and the piston.

The scraper blade means may include a scraper blade which is mounted on a resilient mounting and the biasing means may act between the support structure and the mounting.

The biasing means may be constrained to act in a vertical direction.

The stiffness of the biasing means may be less than the stiffness of the mounting so that the biasing means may compress before the mounting compresses.

The mounting may be designed to deflect laterally.

The mounting may include a block which includes one or more formations each of which is respectively adapted to receive biasing means.

The invention also provides a mounting for use in a conveyor scraper which includes a body which is formed from a resiliently deformable material with a first formation at one end to which a scraper blade is attached, a second formation at an opposed end whereby the body is attachable to fixed structure, and a passage between the first and second formations which encourages resilient flexing of the body about the passage in a lateral sense relatively to a line extending between the said first and second formations.

BRIEF DESCRIPTION OF THE DRAWINGS

The invention is further described by way of examples with reference to the accompanying drawings in which:

FIG. 1 is an end view of a conveyor scraper according to one form of the invention, FIG. 2 is a side view of the scraper of FIG. 1, FIG. 3 is a view partly sectioned of a scraper according to a second form of the invention, FIG. 4 is a view from below of a block for use in a variation of the invention, FIG. 5 is a cross-sectional side view of the block shown in FIG. 4, FIG. 6 is a cross-sectional end view of the block, FIG. 7 is a cross-sectional side view of a mounting to which the block of FIGS. 4 to 6 is attached.

DESCRIPTION OF PREFERRED EMBODIMENTS

Figure 8:
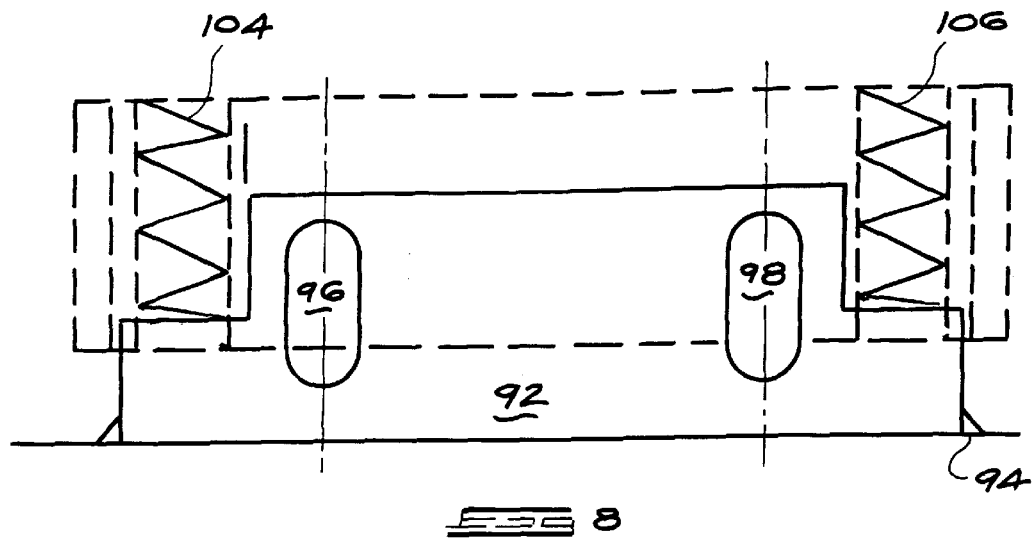
FIG. 8 is a side view, partly sectioned, illustrating the use of the mounting as shown in FIG. 7.

FIGS. 1 and 2 of the accompanying drawings illustrate a conveyor belt scraper 10 according to a first form of the invention which includes a support 12 fixed to suitable structure, not shown, and a scraper blade 14. The scraper blade may be one of a plurality of similar scraper blades which are positioned in line or in any other array, according to requirement.

The scraper blade includes a body 16 and a hard wearing or abrasive resistant scraping edge 18 attached to an upper end of the body 16.

The body 16 is formed with at least two slots 20, although only one slot is visible in FIG. 2. The slot accommodates a coil spring 24 which acts against an upper end 26 of the slot. A lower end of the spring is located in a cup washer 28 which bears against a bolt 30.

The spring is retained inside the slot using any appropriate cover or retaining mechanism 32, shown somewhat conceptually, in FIG. 1.

The bolt 30 is fixed to the support 12 but is loosely engaged with the slot 20.

The edge 18 is brought into scraping contact with a surface 34 of an overlying conveyor belt 36. It is apparent that the spring 24 acts in a direction which urges the edge 18 towards the surface 34. Thus, as the edge 18 is abraded, the spring 24 acts to bias the edge towards the surface and ensures that, within reason, the edge is retained in scraping contact with the surface.

On the other hand if the belt 36 moves in a vertical direction, towards the support 12, the spring 24 can compress and accommodate this movement.

FIG. 3 shows an alternative arrangement which is considerably more robust than the construction shown in FIGS. 1 and 2. A threaded socket 40 is fixed to suitable support structure 42 which underlies a conveyor belt, not shown. A cylinder 44 which is externally threaded, is threadedly engaged with the socket 40. By turning the cylinder relatively to the socket the vertical position of the cylinder relatively to the socket can be adjusted upwardly or downwardly.

Mounted inside the cylinder is a piston 46 which is surrounded by a coil spring 48 which acts between an upper washer 50 and a lower washer 52. The lower washer is in contact with a base 54 of the cylinder.

A lower end 56 of the piston projects from the underside of the cylinder and a washer 58 is engaged therewith. A pin 60 which passes through a hole in the lower end 56 keeps the washer captive on the piston.

The upper end of the piston includes an extension piece 62 which has a lower shoulder 64 which bears on the upper washer 50. The extension piece includes a mounting hole 66 to which a scraper blade, not shown, can be attached. A shroud 68 is engaged with the extension piece and the upper end of the cylinder and prevents or limits the ingress of foreign material into the interior of the cylinder.

It is apparent that the spring 48 urges the extension piece 62, and hence the scraper blade which is attached to it, upwardly into scraping engagement with the overlying conveyor belt surface which is to be cleaned. The spring 48 thus acts similarly to the spring 24 shown in FIGS. 1 and 2 and ensures that, within reason, the vertical position of the scraper blade is adjusted to compensate for wear of the scraper blade which occurs due to the abrading action of the conveyor belt surface sliding over the blade.

The piston 46 can also move downwardly, with the spring 46 being further compressed, to allow for vertical downwards movement of the belt which may occur due to a variety of reasons.

Vertical movement of the piston is guided by the washer 50 which slides inside the cylinder 44.

Further, as has been noted, the vertical position of the cylinder can be adjusted periodically by rotating the cylinder in the socket 40 to provide a further means, in this case manual, for allowing for adjustment to compensate for wear of the scraper blade.

The arrangements shown in FIGS. 1 to 3 permit vertical movement of the scraper blade. In practice however horizontal movement, i.e. lateral deflection of the scraper blade must also be provided for, at least to a limited extent. FIGS. 4 to 9 illustrate a practical scraper blade mounting arrangement which exhibits a capacity for vertical movement and lateral deflection.

FIGS. 4 to 6 illustrate a block 70 which is moulded from a suitable plastics material and which includes an internal slot 72 with vertically extending enlarged circular recesses 74 and 76 respectively. Two holes 78 and 80 respectively extend transversely through the block.

The block 70 is mounted to a base 82 of a resilient mounting or torsion element 84, see FIG. 7. The mounting has a body which is formed from a resiliently deformable plastics material e.g. rubber or polyurethane with a passage 86 which may be offset slightly from a centre line of the body. The passage forms a zone of weakness which encourages resilient flexing of the mounting about the passage in a transverse or lateral sense, relatively to a line extending between its opposed upper and lower ends.

At its upper end the mounting has a slot 88 in which is moulded an insert 90. A scraper blade, not shown, is in use of the mounting located inside the insert. The blade extends from the mounting in an upwards direction.

In an alternative arrangement the block 70 is moulded into and is directly bonded to the buffer 84.

FIG. 8 shows a mounting plate 92 which is fixed to a mounting bar or tube 94 of a conveyor scraper assembly. A plurality of similar mounting plates are fixed to the bar in line extending in the longitudinal sense of the bar.

The plate 92 has vertically aligned slots 96 and 98.

Figure 9:
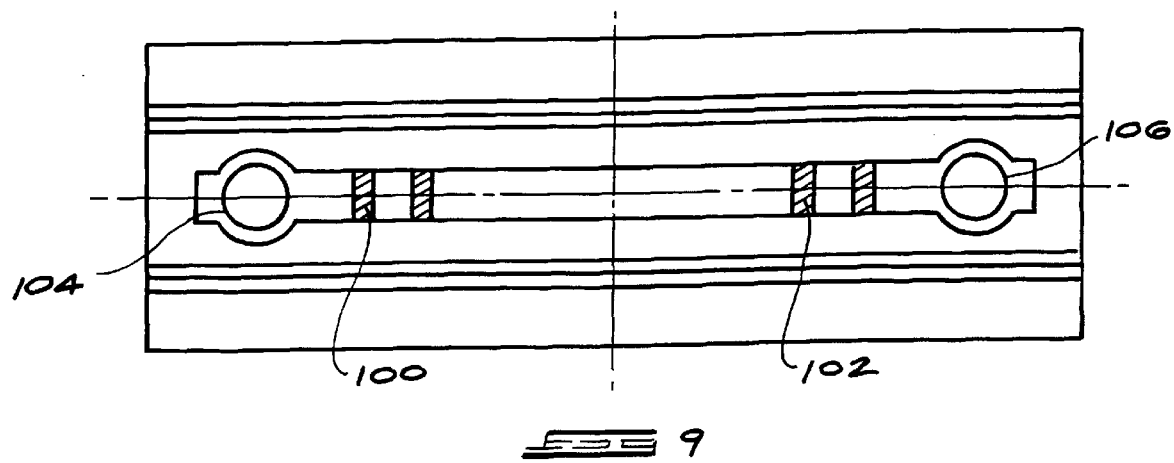
FIG. 9 is a cross-sectional plan view through the arrangement shown in FIG. 8.

FIG. 9 is a plan view, partly sectioned, of the assembly shown in FIG. 8 with the mounting 84 attached to the plate 92. Spacers 100 and 102 are positioned in the slots 96 and 98. The enlarged recesses 74 and 76 of the block 70 house coil springs 104 and 106 respectively. It is possible to push the mounting downwardly onto the plate 92 and compress the springs 104 and 106 fully. The mounting is fixed to the plate 92 by means of bolts, not shown, which pass through the slots 96 and 98 and the respective spacers 100 and 102. The bolts keep the mounting captive on the plate 92 but permit the mounting to move vertically up or down within the constraint imposed by the slots 96 and 98.

A scraper blade, not shown, is mounted in the slot 88 and the insert 90 of the mounting. As the blade wears during use the springs 104 and 106, which are constantly under compression, extend vertically and urge the mounting upwardly to compensate for the wear of the blade. If a lateral force is exerted on the mounting, due for example to an irregularity which is on the conveyor belt surface and which impacts the blade, then the mounting is able to deflect in a lateral sense due to the weakened zone created by the passage 86 in the body of the mounting.

In an alternative arrangement the scraper blade is moulded into and is directly bonded to the mounting 84.

The assembly shown in FIGS. 7 and 8 is capable of vertical adjustment to compensate for wear of the scraper blade and, when required, can deflect laterally.

Figure 10:
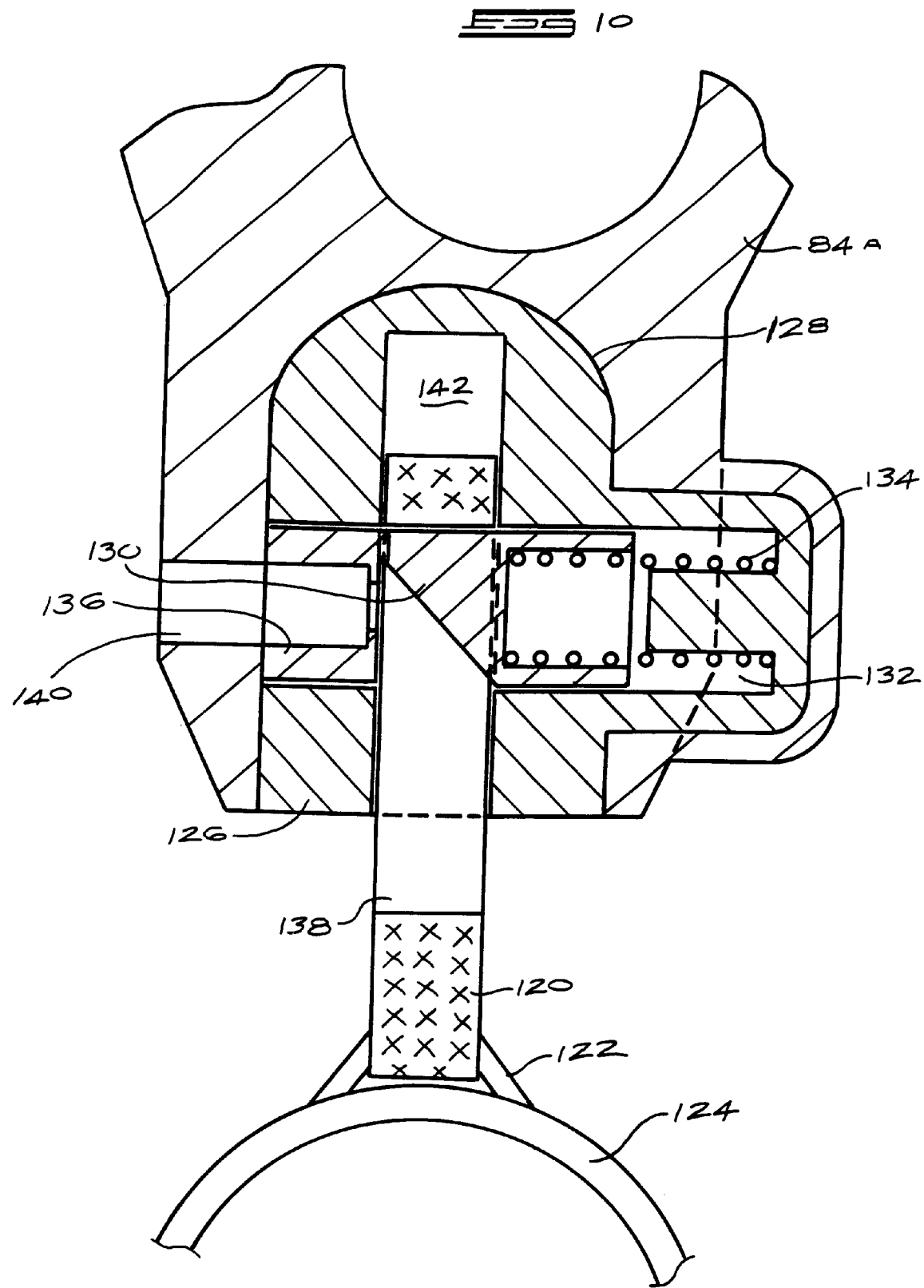
FIG. 10 is a side view of a lower end of a modified mounting and a fixing arrangement for the mounting.

FIG. 10 illustrates, on an enlarged scale, the lower end of a modified mounting 84A which in many respects is similar to the mounting shown in FIG. 7. The mounting is attached to a support plate 120 which is attached by means of welding 122 to a support tube 124.

An insert 126 is located inside a cavity 128 on a lower side of the mounting. The insert may be bonded to the mounting 84A. A catch member 130 is located inside a passage 132, formed inside the insert, and is biased to the left in the drawing by means of a coil spring 134. The catch member has a sealing plate with a rupture disk 136 at its left hand end in the drawing.

The support plate 120 has an elongate slot 138 which is similar to the slots 96 and 98 shown in FIG. 8 and which permits vertical movement of the mounting 84A relatively to the mounting plate, under the action of one or more springs, not shown.

It is to be noted that an opening 140 in a base of the mounting 84A does not permit the catch member 130 to be removed, by horizontal sliding movement, as is the case with the bolts which are used in the slots 96 and 98. On the other hand the opening 140 does provide access to the sealing plate and rupture disk.

When the mounting is to be mounted to the support plate the upper edge of the support plate is advanced into an elongate slot 142 which is formed in the insert 126 and which is similar to the slot 72 shown in FIG. 4. The catch member 130 is then deflected to the right, against the biasing action of the spring 134, to permit this movement. Once the left hand end of the catch member reaches the slot 138 the spring biases the catch member to the left in the drawing and the catch member then engages, with a snap action, with the left hand portion of the passage 132 in the insert.

The catch member secures the mounting to the support plate in such a way that the mounting is capable of relative vertical movement in a manner which is analogous to what has been described hereinbefore with reference to FIGS. 5 to 9. When the scraper blade which is mounted to the mounting is worn, or if for any other reason it becomes necessary to remove the mounting from the support plate, then by making use of a sharp instrument which is inserted into the opening 140 it is possible to fracture or break the rupture disk 136 and depress the catch member 130 thus releasing it. The mounting can then be removed from the support plate. The arrangement thus makes it possible for a mounting to be removed, using only one tool, and for a new mounting to be installed, without using any tools.

What is claimed is:

1. A conveyor scraper for use in conjunction with a belt conveyor having a surface to be cleaned by the scraper, the conveyor scraper comprising: a support structure, at least one biasing member having a first end coupled to the support structure and a second end projecting in a first direction toward said surface of the belt conveyor to be cleaned, a mounting 84 having a base 82 coupled to the at least one biasing member second end, the mounting including a blade receiving slot along a margin adjacent the belt conveyor, blade being engaged in the slot of the mounting, the blade having an upper edge bearing against said surface of the belt conveyor to be cleaned, the mounting being composed of a resilient material and including a zone of weakness situated between the mounting base and the blade receiving slot promoting resilient deformation of the mounting at least in a direction transverse to said first direction.

2. The conveyor scraper of claim 1 wherein the mounting includes at least one passage extending within said zone of weakness in a direction transverse to said first direction.

3. The conveyor scraper of claim 1 wherein the mounting is composed of a resiliently deformable plastics material selected from rubber and polyurethane.

4. The conveyor scraper of any of claims 1 to 3 wherein the support structure includes a mounting plate having at least one slot, a fixing device being engaged with the at least one slot and with said base of the mounting, the fixing device being movable along the slot relative to the mounting plate.

5. The conveyor scraper of any of claims 1 to 3 further comprising a coupling block situated between said at least one biasing member second end and said mounting base, the coupling block including an internal slot aligned with said blade receiving slot.

6. The conveyor scraper of claim 5 wherein the coupling block further includes a pair of enlarged recesses near the ends of the internal slot.

7. The conveyor scraper of claim 5 wherein the coupling block is bonded to said mounting base.

8. A conveyor scraper for use in conjunction with a belt conveyor having a surface to be cleaned by the scraper, the conveyor scraper comprising: a support structure, at least one biasing member having a first end coupled to the support structure and a second end projecting in a first direction toward said surface of the belt conveyor to be cleaned, a blade having an upper edge bearing against said surface of the belt conveyor to be cleaned and a lower edge, a mounting having a slot along an upper margin receiving the blade lower edge, the mounting having a base coupled to the at least one biasing member second end, the mounting including a blade receiving slot along a margin adjacent the belt conveyor, the mounting being composed of a resilient material and including a zone of weakness situated between the mounting base and the blade receiving slot promoting resilient deformation of the mounting at least in a direction transverse to said first direction.

9. The conveyor scraper of claim 8 wherein the mounting includes at least one passage extending within said zone of weakness in a direction transverse to said first direction.

10. The conveyor scraper of claim 9 wherein the mounting is composed of a resiliently deformable plastics material selected from rubber and polyurethane.

11. The conveyor scraper of any of claims 8 to 10 wherein the support structure includes a mounting plate having at least one slot, a fixing device being engaged with the at least one slot and with said base of the mounting, the fixing device being movable along the slot relative to the mounting plate.

12. The conveyor scraper of any of claims 8 to 10 further comprising a coupling block situated between said at least one biasing member second end and said mounting base, the coupling block including an internal slot aligned with said blade receiving slot and a pair of enlarged recesses near the ends of the internal slot.

13. The conveyor scraper of claim 12 wherein said at least one biasing member comprises two biasing members, the two biasing members being received in said pair of enlarged recesses near the ends of the internal slot of the coupling block.

14. A mounting for use in a conveyor scraper used in conjunction with a belt conveyor having a surface to be cleaned by the scraper, the conveyor scraper comprising: a support structure, at least one biasing member having a first end coupled to the support structure and a second end projecting in a first direction toward said surface of the belt conveyor to be cleaned, a blade having an upper edge bearing against said surface of the belt conveyor to be cleaned and a lower edge, a mounting having a slot along an upper margin receiving the blade lower edge, the mounting having a base coupled to the at least one biasing member second end, the mounting including a blade receiving slot along a margin adjacent the belt conveyor, the mounting being composed of a resilient material and including a zone of weakness situated between the mounting base and the blade receiving slot promoting resilient deformation of the mounting at least in a direction transverse to said first direction.

15. The mounting of claim 14 further including at least one passage extending within said zone of weakness in a direction transverse to said first direction.

16. The mounting of claim 14 composed of a resiliently deformable plastics material selected from rubber and polyurethane.

* * * * *